United States Patent Office 3,428,807
Patented Feb. 18, 1969

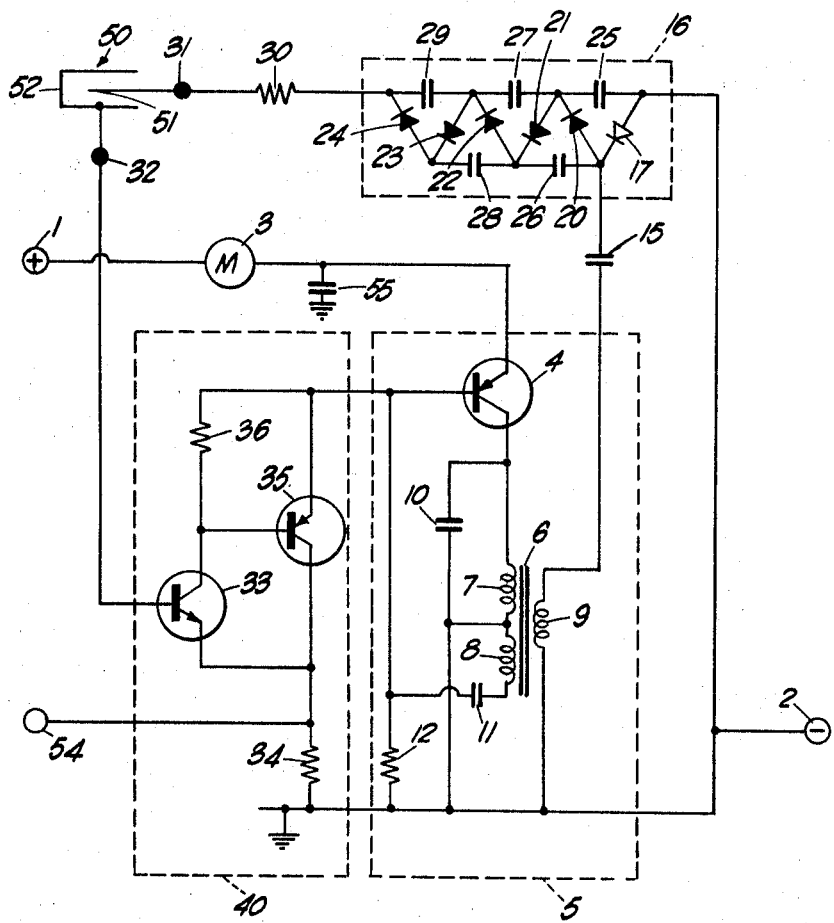

3,428,807
HIGH VOLTAGE SUPPLY FOR RADIATION DETECTING EQUIPMENT
Alun R. Jones, Deep River, Ontario, and Dale A. Gedcke, Edmonton, Alberta, Canada, assignors to Atomic Energy of Canada Limited, Ottawa, Ontario, Canada, a corporation of Canada
Filed Mar. 1, 1965, Ser. No. 436,161
U.S. Cl. 250—83.6          3 Claims
Int. Cl. G01t *1/18*

ABSTRACT OF THE DISCLOSURE

A transistorized high voltage supply for radiation detector tubes in which the high voltage is produced by the multiplication and rectification in a Cockcroft-Walton multiplier of an AC signal produced by a blocking oscillator whose free-running frequency is low, and a control circuit is used which accelerates the frequency of operation of the blocking oscillator each time a pulse in the tube occurs by varying the resistance of the RC circuit which determines the oscillator's free-running frequency.

---

This invention relates to an arrangement for a high voltage supply particularly adapted for use in connection with portable radiation detector apparatus.

Hitherto high voltage power supplies for Geiger counters and the like have displayed a number of characteristics which have rendered them awkward where considerations of portability, size and weight are important. In the first place, many such supplies do not deliver to the Geiger counter tube a high DC voltage which is adequately regulated against either variations in the battery or other supply voltage itself, or against changes in the drawn by the Geiger tube. Secondly, conventional power supplies for this purpose make demands on the prime energy source which are substantially unrelated to the Geiger counter pulse rate. In the case of portable supplies, this necessitates higher capacity batteries than would be necessary if the current demands made thereon varied directly with the pulse rate of the Geiger counter tube itself.

We have found that the disadvantages referred to above can be overcome by providing a high voltage supply for a radiation detector, such as a Geiger counter tube, which comprises input terminals adapted for connection to a source of relatively low DC voltage such as a battery, and an oscillator having a normally low free-running frequency which is adapted to convert to AC energy drawn from the low voltage DC source. Means are connected between the output of the oscillator and the output terminals of the supply for rectifying, stabilizing and increasing the AC voltage developed by the oscillator which is thus converted into a relatively high regulated DC voltage suitable for energization of the radiation detector. A coupling circuit is disposed between the output terminals of the supply and the oscillator for triggering the same and increase its frequency of output in a manner which varies in accordance with the pulse rate of the radiation detector. Because of the last-mentioned characteristic, the current drawn from the battery is correlated with the counting rate of the radiation detector with the result that a meter disposed to measure such current provides a simple, convenient monitor of the counting rate and at the same time heavy demands are made on the battery only when the counting rate is high.

The invention will be described with reference to the attached figure of drawings in which a schematic view of the circuitry of our invention is shown.

Positive and negative input terminals 1 and 2 are adapted to be connected to a low voltage DC source such as a battery. As shown in the drawing the negative terminal 2 is grounded whereas the positive terminal 1 is through current meter 3 fed to the emitter of a p-n-p transistor 4 which forms part of an oscillator generally represented at 5. In the particular embodiment of the invention shown, the circuit 5 is a conventional free-running blocking oscillator and comprises, in addition to transistor 4, transformer 6 having primary windings 7 and 8, secondary winding 9, condensers 10 and 11 and resistor 12. As is well known to persons skilled in the art, transistor 4 will, in the absence of triggering voltage, alternate between the two states of conductivity and non-conductivity. During the conducting state, collector current will charge capacitor 10 and will at the same time flow through the upper part 7 of the primary winding of transformer 6. At the same time the base current of transistor 4 serves to charge condenser 11 and in so doing draws a small current through resistor 12. As the condensers 10 and 11 become charged, a positive voltage is applied to the base of transistor 4 so as to cut off emitter-collector current flow. When this occurs, a current is established in the same direction in both parts 7 and 8 of the primary of transformer 6. This in turn causes a voltage to be developed across secondary 9 which is, through coupling condenser 15, applied across the input of a voltage multiplier generally indicated at 16. As is well known, the time constant of the RC circuit 11, 12 determines the free-running frequency of the arrangement. In accordance with our invention the resistor 12 is given a relatively high ohmic value so that the free-running frequency of oscillator 5 is kept low.

In the particular embodiment shown in the drawings, the voltage multiplier 16 comprises a Zener diode 17 which serves to limit to a predetermined amount the voltage established across it. Such regulated voltage is then applied to a Cockcroft-Walton voltage multiplier circuit which comprises diodes 20 to 24 and condensers 25 to 29. The operation of the voltage multiplier is such that there is established at the junction of diode 24 and condenser 29 a relatively high DC voltage, positive with respect to ground, which is connected through current limiting resistor 30 to positive output terminal 31 as shown.

The negative output terminal 32 is connected to ground through the input of a coupling circuit generally represented at 40. In the particular embodiment of the invention shown, the coupling circuit 40 comprises an amplifier-inverter circuit which includes n-p-n transistor 33, p-n-p transistor 35, and resistors 34 and 36 connected as shown. The arrangement is such that, when a radiation detector such as Geiger counter 50 is connected so that its anode 51 and cathode 52 are respectively connected to output terminals 31 and 33, the output pulses from the counter are applied across the base emitter junction of transistor 33. These pulses are then inverted and amplified and applied to transistor 35 in such a way as to cause the same to switch resistor 34 (which has a relatively low ohmic value) in parallel with resistor 12 thus triggering the blocking oscillator 5 each time a pulse occurs. It follows that the frequency of the output voltage developed across the secondary 9 of transformer 6 is equal to the free-running frequency of the oscillator 5 plus the Geiger counter pulse rate. In this way, the current demands made on the low voltage DC source are directly related to the counter pulse rate so that meter 3, which measures such current demands, will give a direct indication of the pulse rate. In addition an output 54, taken from the upper end of resistor 34, is available to drive other circuits with pulses derived from the Geiger counter. The condenser 55 is disposed between the emitter of transistor 4 and ground in order to decrease the output impedance of the supply while a pulse of current is being drawn through transistor 4.

In one particular embodiment of our invention the following values were used for the various components:

Resistors:
- 30 ———————————————— ohms — 4.7M
- 36 ———————————————— do —— 1K
- 34 ———————————————— do —— 56
- 12 ———————————————— do —— 10M Capacitors:
- 55 ———————————————— µf — 30
- 10, 11, 15, 25 to 29 ———— µf — .05

Transistors:
- 4 and 35 ———————————————— 2N1309
- 33 ———————————————————— 2N743

Zener diode 17 ———————————————— 1N742
Diodes 20 to 24 ———————————————— 1N459
Radiation tube 50 ———————————— Philips 18529
Low voltage 1 ———————————— v. D.C — 6.5
High voltage 31 ———————————— v. D.C — 450

What we claim is:

1. A high voltage supply for energizing a radiation detector tube, comprising: a blocking oscillator having a relatively low free-runing frequency as determined by the time constant of an RC circuit, and adapted to convert a DC voltage to an AC signal; first means for multiplying and rectifying said AC signal including an output terminal for applying the multiplied and rectified AC signal to a first electrode of said radiation detector tube; and second means coupled to the other electrode of said radiation detector tube and to said blocking oscillator for increasing the frequency of said blocking oscillator in accordance with the pulse rate of said radiation detector tube; said second means including a resistance in series with a switching means, said switching means being responsive to pulses produced by said detector to momentarily couple said resistance with said RC circuit and thus substantially shorten said time constant; whereby the frequency of said blocking oscillator be substantially equal to the oscillator's free-running frequency plus the radiation detector tube pulse rate.

2. A high voltage supply as defined in claim 1, wherein said switching means is the collector-emitter circuit of a semiconductor device whose control electrode is biased into conduction in response to pulses produced by said detector.

3. A high voltage supply as defined in claim 2, wherein said second means incorporates an amplifier transistor having its base electrode connected to the said other electrode of said radiation detector tube, and its collector electrode coupled to said control electrode of said semiconductor device.

References Cited

UNITED STATES PATENTS

| | | | |
|---|---|---|---|
| 2,549,058 | 4/1951 | Constable | 250—83.6 |
| 3,050,625 | 8/1962 | Wesley | 250—83.3 |
| 3,197,691 | 7/1965 | Gilbert | 321—18 |
| 3,202,902 | 8/1965 | Glass | 321—18 X |
| 3,243,689 | 3/1966 | Perrins | 321—18 X |

RALPH G. NILSON, Primary Examiner.

SAUL ELBAUM, Assistant Examiner.

U.S. Cl. X.R.

307—157; 321—18